US006918151B2

(12) United States Patent
Massey

(10) Patent No.: US 6,918,151 B2
(45) Date of Patent: Jul. 19, 2005

(54) SUPPORT LEG SYSTEM AND METHOD FOR SUPPORTING A DOCK LEVELER

(75) Inventor: Douglas H. Massey, Milwaukee, WI (US)

(73) Assignee: SPX Dock Products Inc., Sussex, WI (US)

( * ) Notice: Subject to any disclaimer, the term of this patent is extended or adjusted under 35 U.S.C. 154(b) by 0 days.

(21) Appl. No.: 10/324,012

(22) Filed: Dec. 20, 2002

(65) Prior Publication Data

US 2004/0117926 A1 Jun. 24, 2004

(51) Int. Cl.⁷ ................................................. E01D 1/00
(52) U.S. Cl. ........................................................ 14/69.5
(58) Field of Search ............................... 14/69.5, 71.1, 14/71.3

(56) References Cited

U.S. PATENT DOCUMENTS

| | | | |
|---|---|---|---|
| 3,728,753 A | 4/1973 | Beckwith et al. | |
| 3,835,497 A | 9/1974 | Smith | |
| 3,858,264 A | 1/1975 | Kuhns et al. | |
| 3,877,102 A | 4/1975 | Artzberger | |
| 3,902,213 A | 9/1975 | Pfleger et al. | |
| 3,995,342 A | 12/1976 | Wiener | |
| 4,279,050 A | 7/1981 | Abbott | |
| 4,328,602 A | 5/1982 | Bennett | |
| 4,455,703 A | 6/1984 | Fromme et al. | |
| 4,531,248 A | 7/1985 | Swessel et al. | |
| 4,619,008 A | 10/1986 | Kovach et al. | |
| 4,744,121 A | 5/1988 | Swessel et al. | |
| 4,847,935 A | 7/1989 | Alexander et al. | |
| 4,974,276 A | 12/1990 | Alexander | |
| 5,123,135 A | 6/1992 | Cook et al. | |
| 5,440,772 A | 8/1995 | Springer et al. | |
| 5,481,774 A | 1/1996 | Hodges et al. | |
| 5,551,113 A | 9/1996 | Marler et al. | |
| 5,553,343 A | 9/1996 | Alexander | |
| 5,560,063 A | 10/1996 | Alten et al. | |
| 5,640,733 A | 6/1997 | Alten et al. | |
| 5,813,072 A | 9/1998 | Alexander | |
| 5,832,554 A | 11/1998 | Alexander | |
| 6,035,475 A | 3/2000 | Alexander | |
| 6,061,859 A | 5/2000 | Winter | |
| 6,085,375 A | 7/2000 | Holm | |
| 6,216,303 B1 | 4/2001 | Massey | |
| 6,276,016 B1 | 8/2001 | Springer | |
| 6,311,352 B1 | 11/2001 | Springer | |
| 6,327,733 B1 | 12/2001 | Alexander et al. | |
| 6,440,772 B1 | 8/2002 | Smith | |
| 6,460,212 B2 | 10/2002 | Massey et al. | |
| 6,473,926 B2 | 11/2002 | Lounsbury | |
| 2002/0092102 A1 | 7/2002 | Lounsbury | |

OTHER PUBLICATIONS

U.S. Appl. No. 10/385,751, filed Mar. 12, 2003, Hoofard et al.
U.S. Appl. No. 10/401,948, filed Mar. 31, 2003, Webster.

Primary Examiner—Thomas B. Will
Assistant Examiner—Raymond W Addie
(74) Attorney, Agent, or Firm—Baker & Hostetler LLP

(57) ABSTRACT

A support leg system and method for supporting a dock leveler. The support leg system includes a support leg, cam, engaging surface, and counterbalancing apparatus. The method includes moving a support leg to a non-supporting position when the dock leveler ramp is engaged with a vehicle, and moving the support to a supporting position if the dock leveler ramp descends too quickly.

11 Claims, 4 Drawing Sheets

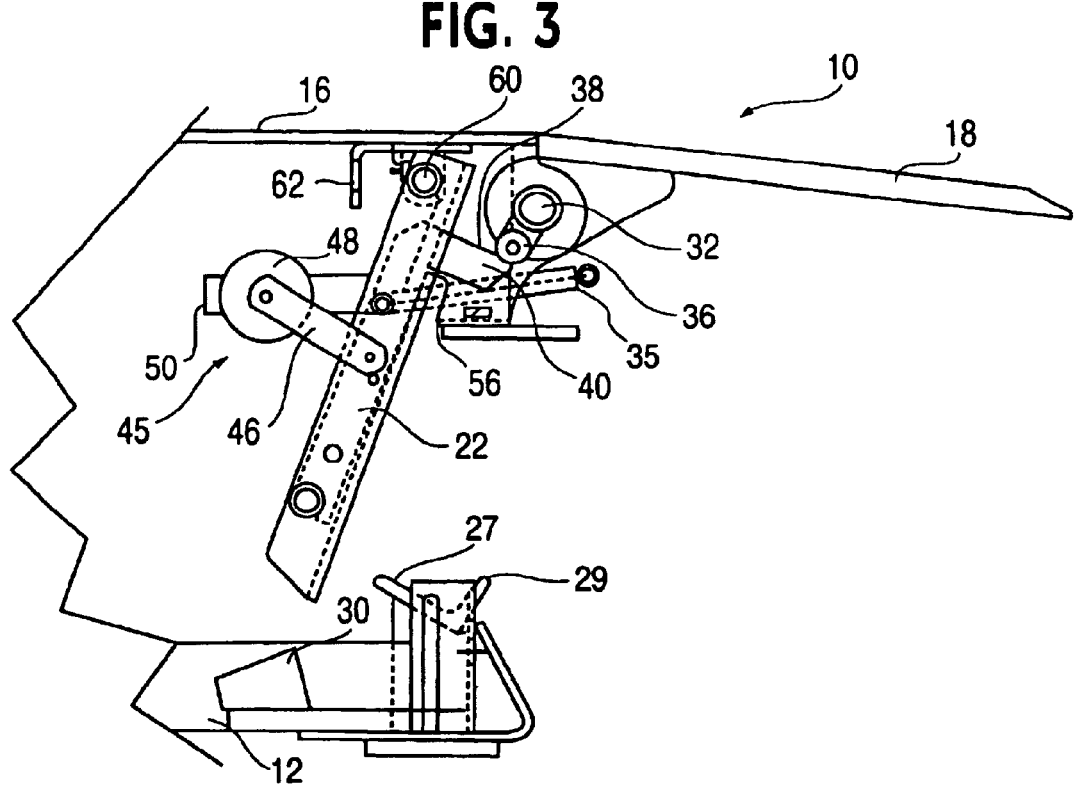
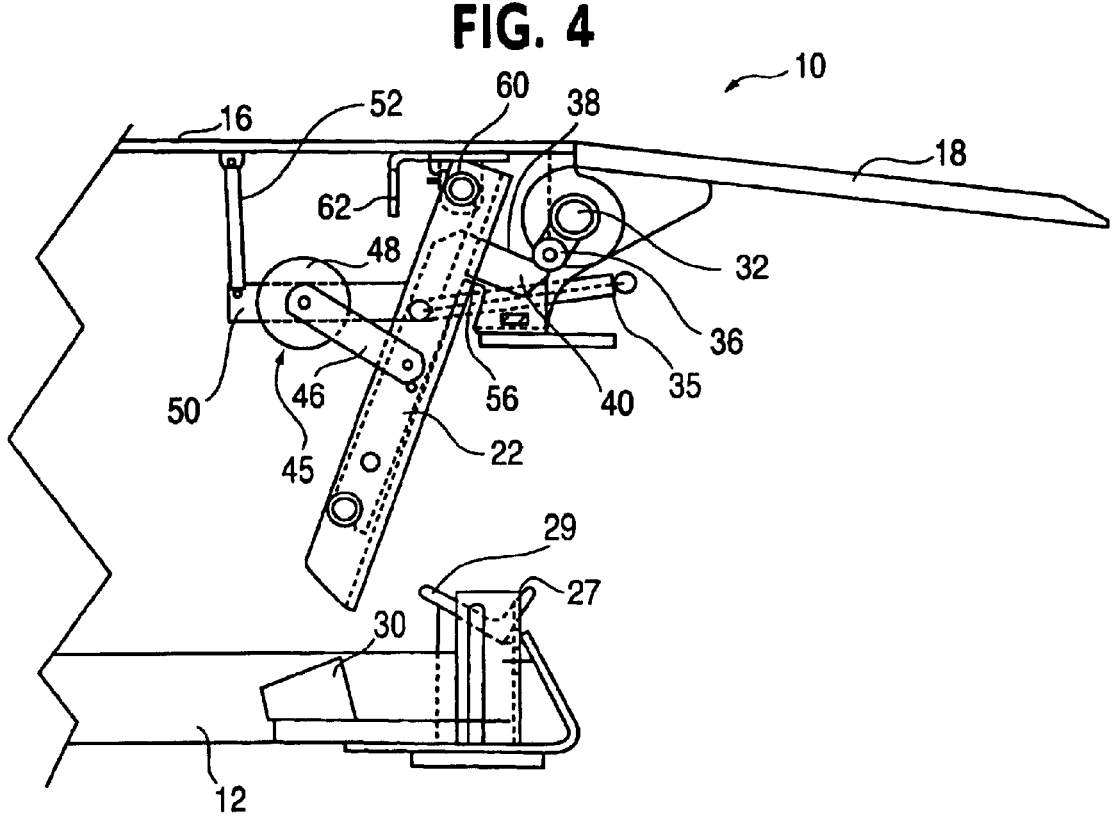

SUPPORT LEG SYSTEM AND METHOD FOR SUPPORTING A DOCK LEVELER

FIELD OF THE INVENTION

The present invention relates generally to dock levelers. More particularly, the present invention relates to a method and apparatus for providing support legs for a docklever configured to minimized the effects of stumpout and freefall.

BACKGROUND OF THE INVENTION

Dock levelers may be mounted in loading docks and may be used to bridge a gap between a loading dock and the end of a vehicle parked at the loading dock. For example trucks or tracker trailers may be loaded and unloaded at loading docks with the help of a dock leveler. The dock leveler enables material handling equipment such as a fork lift to move between the dock and the vehicle bed. Because not all vehicle beds are of the same height many dock levelers are configured to pivot up and down in order to adjust and create a bridge between the loading dock and the vehicle bed. Typical dock levelers include a ramp portion. In addition, dock levelers may include a lip mounted at the end of the ramp. When a vehicle backs up to the dock, often the lip is extended and rests directly on the bed of the vehicle. Some dock levelers use the bed of the vehicle as a support for the lip and the ramp so that vehicles, such as fork lifts, material, and operators move between the vehicle bed and the dock.

If a vehicle, whose bed is supporting the dock leveler, were to pull away from the dock, the dock leveler may be unsupported and move rapidly down to an extreme low position under the influence of gravity and strike support structure in the pit of the dock leveler. This condition is known in the industry as free fall. Free fall may have unpleasant consequences particularly when material workers or material handling vehicles such as fork lifts are on the dock leveler during a time when free fall occurs. In order to mitigate the effects of free fall, many dock levelers are equipped with various devices in order to limit or negate the effects of free fall.

One such device used to limit the effects of free fall is a support structure known as a support leg. A dock leveler may have one or more support legs. Often a dock leveler has a pair of support legs. Many support legs are configured so that they support the dock leveler at dock level, (i.e., a position where the ramp is level with the surrounding loading dock). When vehicles back up to a loading dock with the bed of the vehicle located at dock level or above, the dock leveler may be raised, the support legs extended to a supporting position, and the dock leveler lowered until the lip rests on the bed of the vehicle. If the vehicle has a bed located above dock level, the support legs may be slightly above a corresponding support structure configured to support the support legs. Thus, if free fall occurs, the support legs will only permit the dock leveler to fall a limited amount before the support legs engage their support structure.

Alternatively, if a vehicle with a bed located at dock leveler backed up to a dock, the dock leveler will rest on its support legs as well as a lip resting on the bed of the vehicle. Thus, if the vehicle were to pull away from the dock, the dock leveler would not experience any free fall as the support legs would already be supporting the dock leveler.

One problem associated with support legs is that if a vehicle with a bed located below dock level backs up to the dock, the ramp may not be able to lower itself to a below dock position when the support legs are engaged. Thus, the lip portion of the dock leveler must be relied upon to create a ramp between the vehicle bed and the ramp portion of the dock leveler. If the vehicle bed is located too far below dock level the angle of the lip may become steep. Thus inhibiting vehicle traffic between the dock and the vehicle bed. In addition to inhibiting traffic, the steep angle of lip may cause unnecessary wear and tear on the dock leveler, the dock, and the dock leveler support structure as vehicles moving between the vehicle bed and the dock ram into the steep lip. This phenomena of a lip engaging a vehicle bed at a steep angle is known in the industry as stump out.

Stump out can also occur when a vehicle bed is at one level when it first backs up to a dock leveler but as the vehicle is loaded and becomes heavier the vehicle bed may become lower to the ground. As the vehicle bed becomes lower and lower the support legs may engage the support structure thus causing the ramp to be supported by the support legs rather than the vehicle bed. As the vehicle bed becomes lower to the ground due to additional loading of the vehicle the angle between the lip and the vehicle bed may become steeper causing the condition known as stump out.

In order to avoid the condition of stump out many dock levelers include retractable support legs that maintain the ramp in a substantially horizontal position when the ramp is not in use (i.e., when the dock leveler is not engaged with the truck bed). These legs can be retracted for servicing truck beds that are below dock level. Typically a pair of support legs are pivotally attached to the ramp on the lip hinge and extend downwardly to engage a supporting sub frame. These support legs may be spring biased forward toward a supporting position and may be retracted to a non-supporting position by one of several means.

Both manual and automatic mechanisms have been used to retract support legs. Manual support leg retraction mechanisms may require an operator to engage a mechanism, for example, by pulling a chain to retract the support legs as the ramp is being lowered. Automatic support leg retraction mechanisms typically retract the support legs as the lip of the dock leveler is extended. In this way the support leg is retracted when the lip engages a truck. However, retracting the support legs with manual or automatic mechanisms may require additional labor in mating a truck with a dock leveler and may require additional complexity to a dock leveler.

Accordingly, a dock leveler that is able to deal with the problems of free fall and stump out while at the same time reducing the amount of labor and complexity of a dock leveler is desired.

SUMMARY OF THE INVENTION

It is therefore an aspect of some embodiments of the invention to provide a dock leveler support that minimizes the effects of free fall.

It is an aspect of some embodiments of the invention to provide a dock leveler support that minimizes the effects of stump out.

The above and other features and advantages are achieved through the use of a novel support leg system and method as herein disclosed. In accordance with one embodiment of the present invention, a dock leveler support system is provided. The dock leveler support system includes a support leg coupled a dock leveler ramp, the ramp being configured for movement between a raised and lowered position, the support leg configured to move between a support position and a retracted position, the support leg configured to move to the support position when the ramp moves faster than a predetermined speed toward the lowered position.

In accordance with another embodiment of the present invention, the dock leveler support system includes a support leg configured to move between a supporting position and a retracted position, a cam and an engaging surface, which cooperate to move the support leg to a retracted position when activated by movement of a dock leveler lip, and a counterbalancing means for disengaging the cam from the engaging surface to reduce or avoid free fall when a dock leveler ramp disengages from a vehicle bed.

In accordance with another embodiment of the present invention, a method for supporting a dock leveler is provided. The method includes moving a support for a dock leveler to a non-supporting position when either: a lip associated with the dock leveler is raised; the ramp associated with the dock leveler is raised; or the dock leveler is engaged with a vehicle; or, any combination thereof. The method further includes moving the support structure to a supporting position when the dock lever ramp is falling at or faster than a predetermined rate.

There has thus been outlined, rather broadly, some features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a side view illustrating another embodiment of the present invention.

FIG. 4 is a side view illustrating another embodiment of the present invention.

DETAILED DESCRIPTION OF PREFERRED EMBODIMENTS OF THE INVENTION

Some embodiments of the invention may be adapted to apply to dock levelers disclosed in U.S. Pat. Nos. 6,216,303; 4,328,602; and 3,877,102 the disclosures of which are expressly incorporated by reference in their entirety.

Figure 1:
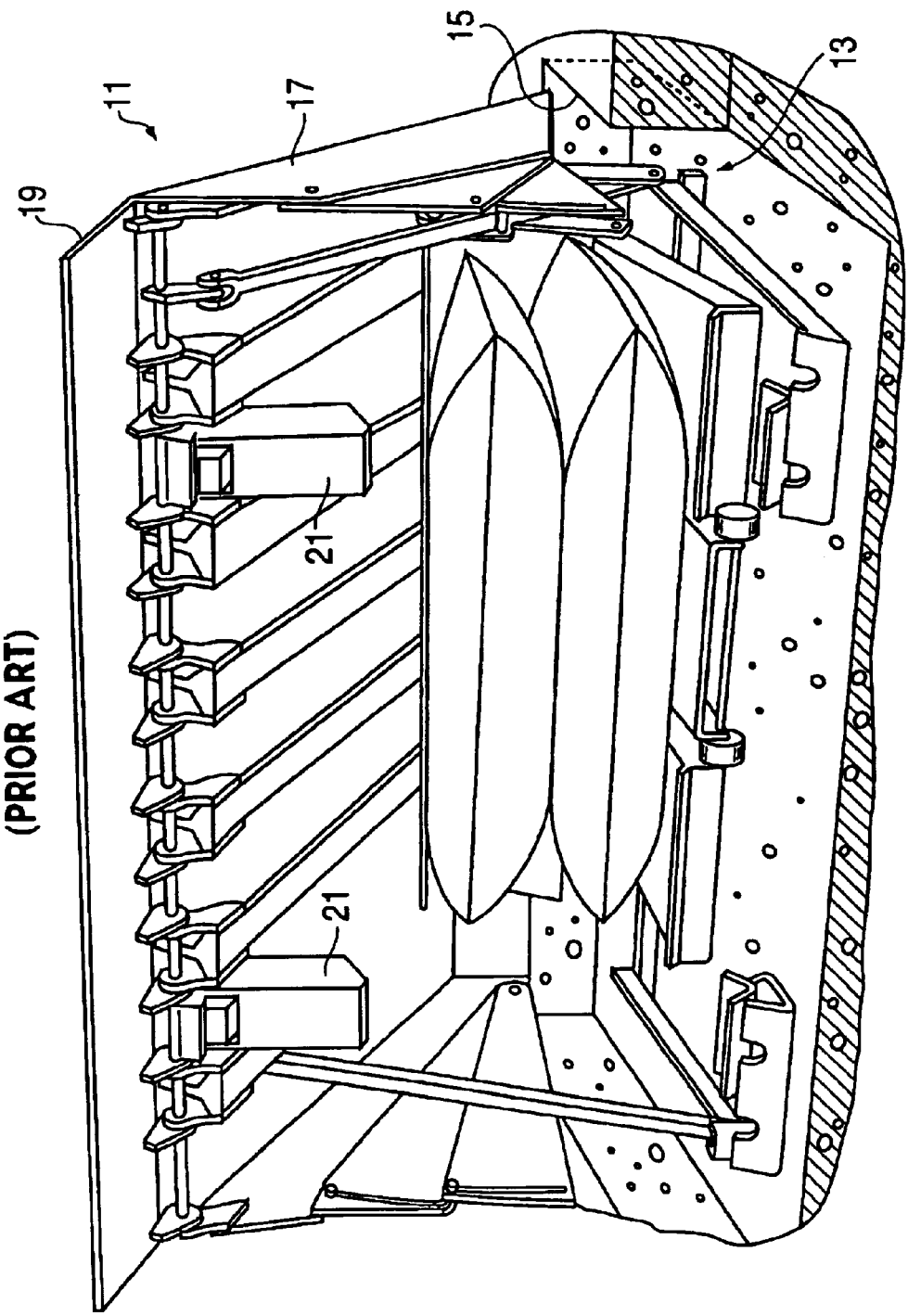
FIG. 1 is a perspective view of an under ramp portion of a typical dock leveler.

Referring now to the figures, wherein like reference numerals indicate like elements, FIG. 1 illustrates a typical dock leveler 11 that may be adapted or fitted with a support system according to an embodiment of the present invention. While FIG. 1 does not illustrate a support leg apparatus in accordance with the present invention, it is useful for showing a possible location of support legs according to the present invention. In FIG. 1, the dock leveler 11 is adapted to bridge the gap between a loading dock and the bed of a truck or carrier parked in front of the loading dock. The dock leveler 11 includes a frame 13 or supporting structure mounted in the rear end of a pit 15, a ramp 17 pivoted to the frame 13, and a lip 19 pivotally attached to the ramp 17. The ramp 17 is movable between a generally horizontal position and upwardly inclined or downwardly declined positions. A dock leveler that may be suitable for application of the present invention is described in U.S. Pat. No. 5,481,774 issued Jan. 9, 1996 to Hodges et. al, the disclosure of which is herein incorporated b reference in its entirety.

Figure 2:
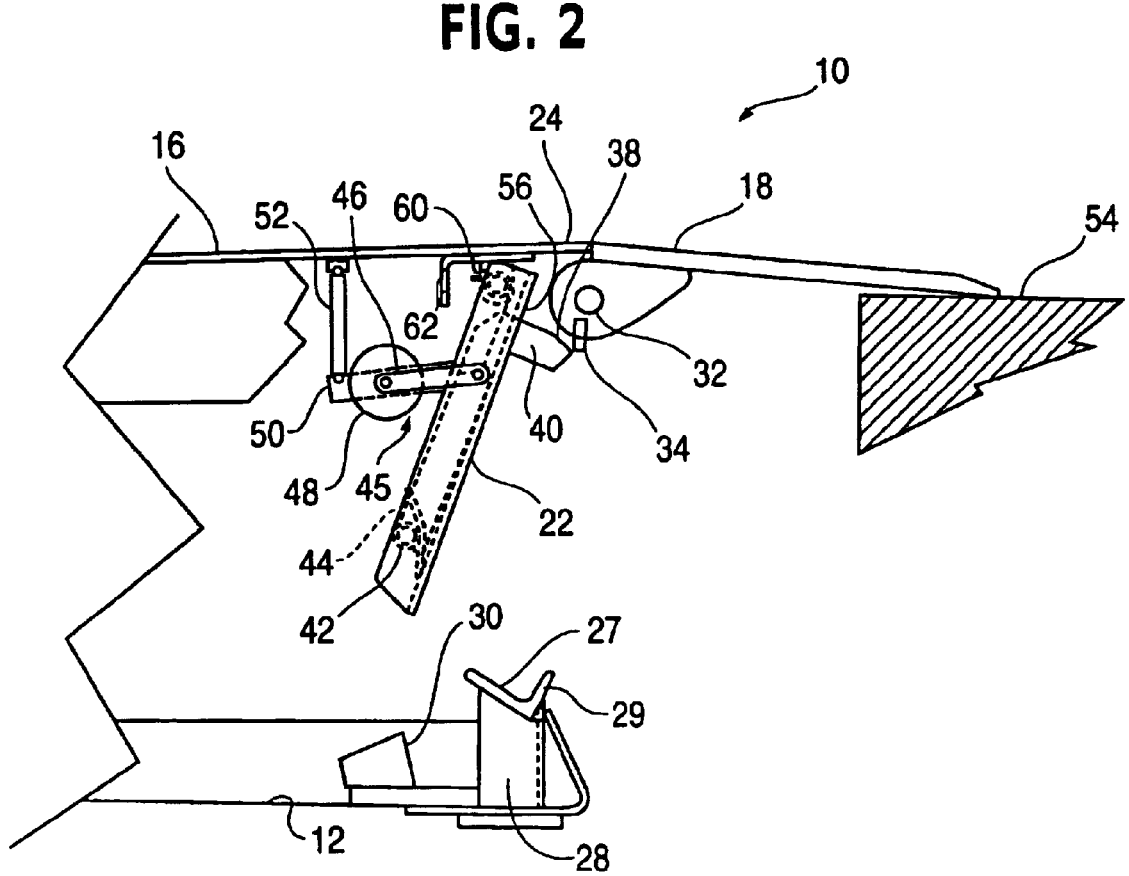
FIG. 2 is a side view illustrating one embodiment of the present invention.

Turning now to the present invention and an embodiment shown in FIG. 2, a support leg apparatus according to one embodiment of the present invention is shown in FIG. 2. The dock leveler 10 is shown with the lip 18 extended and resting on the bed 54 of a vehicle. A support leg 22 is shown in a non-supporting position. The support leg 22 may be attached to the ramp 16 in a pivotal manner having a pivot point 60. The support 22 may be attached to the ramp 16 via a bracket 62.

The illustrated dock leveler 10 includes two support legs 22. The support legs 22 are pivotally mounted to the ramp 16 near the front end 24. The support legs 22 can be rotated between a supporting position and a retracted position. When the support legs 22 are in a retracted position, they allow the ramp 16 to fall to a below dock position. When the support legs 22 are in the supporting position, they support the ramp 16.

Figure 5:
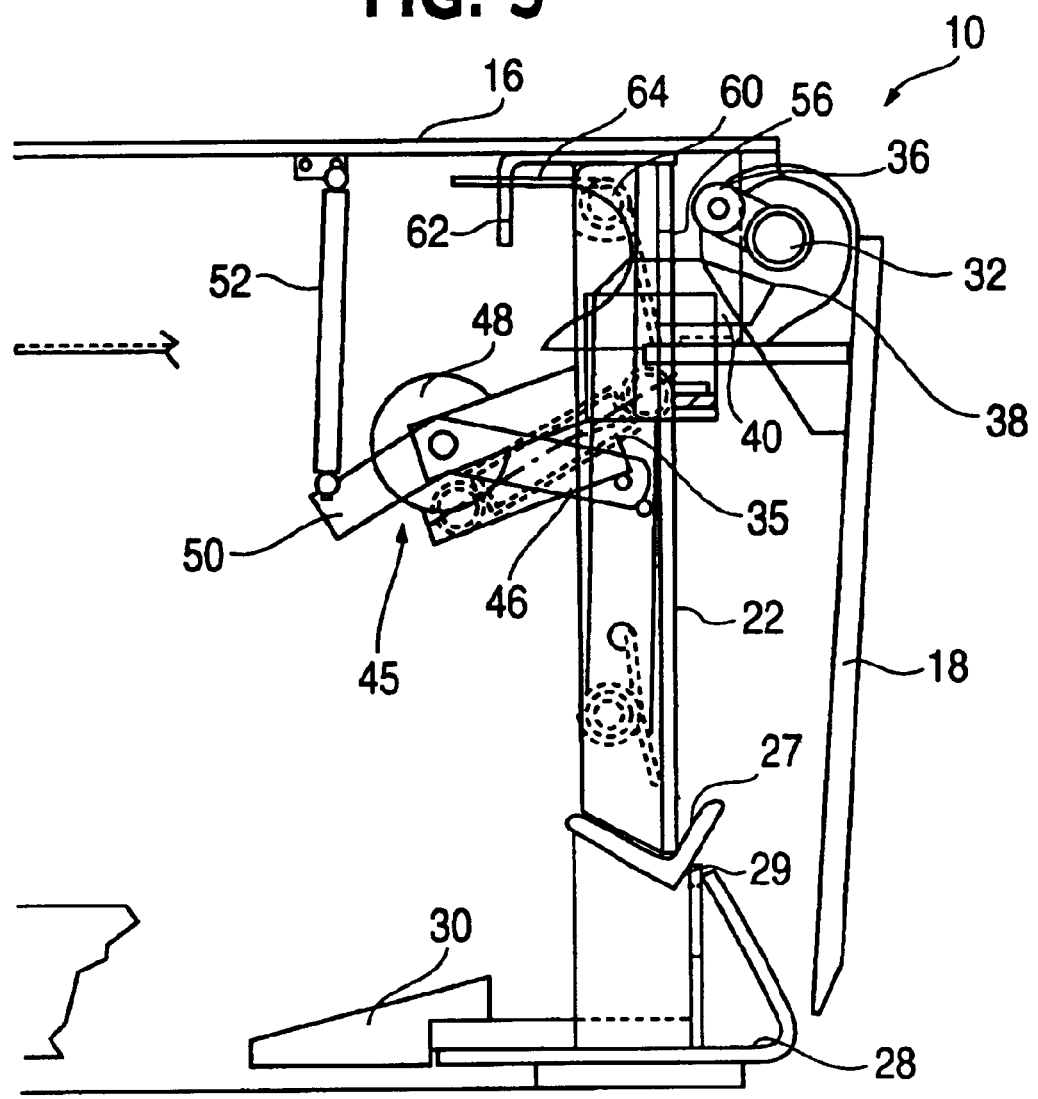
FIG. 5 is a side view of the embodiment shown in FIG. 4 illustrating the support leg in a supporting position.

A supporting sub-frame 28, which may rest on the frame 12 of the dock leveler 10 and engages the support leg 22 in a first supporting position (shown in FIG. 5). The surface 27 of the supporting sub-frame 28 is preferably contoured similar to the surface of the support leg 22. In the illustrated embodiment, for example, the supporting sub-frame 28 includes support 29 having a V-shaped groove to receive the V-shaped end of the support leg 22. In this way, the support leg 22 may be positioned on the supporting sub-frame 28.

Some embodiments of the present invention may provide two support positions for the support 22. A first support position may include the support 22 sitting in a pedestal or abutment 29 configured to support and stabilize the support member 22 as shown in FIG. 5. A second support position may include the support member 22 resting against a stop 30. The stop 30 may be configured to support and/or stabilize the support member 22.

In some embodiments of the invention, the front end 24 of the ramp 16 can descend about four inches when the support leg 22 engages the stop 30. Four inches is approximately half of the maximum possible decent of the front end 24 of eight inches. A similar multiple engagement may also be accomplished, for example, by providing the support legs 22 with a series of notches that can engage the supporting sub-frame 28, as in U.S. Pat. No. 3,858,264 to Kuhns et al the disclosure of which is herein incorporated by reference in its entirety.

One reason for having two support positions 29 and 30 is that the dock leveler 10, when experiencing a free fall, may be configured to move the support member 22 into a support position. However, if the ramp 16 of the dock leveler 10 is initially not very high, the support member 22 may encounter the bottom of the dock leveler 10 or the support structure 12 before the support member 22 can fully swing into a support position. In a case where the support member 22 only partially swings to a supporting position, an alternate support position may be provided to provide some support and stability for the support member 22 in case it is not able to achieve a full supportive position. A stop 30 may be located at the alternative support position to provide stability and/or support to the support member 22.

In some embodiments of the invention, the dock leveler may be configured such that when the ramp 16 is about four inches above the level position, the support member 22 will have time to move to the fully supportive position and engage the support pedestal 29 if a free fall occurs. If the ramp 16 is less than four inches above the level position, the support member 22 may not be able to achieve the full support position in a free fall event but may rather achieve the secondary support position, and the support member 22 will be supported and stabilized by the secondary stop 30.

A torsion spring 64 (shown if FIG. 5), or other biasing means may be configured around the pivot point 60 to bias the support 22 toward the first support position. An example of a torsion spring biasing the support 22 toward a support position is shown, for example in U.S. Pat. No. 6,216,303 to Massey.

In operation, the support member 22 can be rotated to a non-supporting, retracted position by extension and/or rotation of the lip 18 associated with normal dock leveler operation.

According to some embodiments of the present invention, a cam surface 38 and an engaging surface 34 cooperate to retract the support leg 22 when actuated by movement of the lip 18. More specifically, for example, the hinge pin 32 of the lip 18 may have attached to it an engaging surface 34. For example, the engaging surface may be a striker bar 34 as shown in FIG. 2 or a roller 36 as shown in FIGS. 3–5. The engaging surface 34 or 36 is configured to engage a cam surface 38 mounted on a cam arm 40.

According to some embodiments of the invention, the cam arm 40 may be partially located inside the support member 22 and have a portion of the cam arm 40 extend through a hole 56 in the support member 22 to expose the cam surface 38. The cam arm 40 may be coupled to the support member 22 in a pivotal manner at a pivot point 42. A torsion spring 44 may be configured to urge the cam arm 40 to a position where the cam arm 40 extends out the hole 56 extending the cam surface 38 to the engaging surface 34 or 36. When the lip 18 is in an extended or partially extended position with relation to the ramp 16, the engaging surface 34 or 36 may engage the cam surface 38 of the cam arm 40 thus moving the support member 22 to a non-support position. When the lip 18 is in a pendant position, the engaging surface 34 or 36 may be rotated to not engage the cam surface 38 of the cam arm 40 as shown in FIG. 5. Disengaging the cam surface 38 from the engaging surface 34 or 36 may permit the support member 22 to move to a support position due to the biasing elements 64 (see FIG. 5) biasing the support member 22 to the support position.

The support leg apparatus according to the invention also includes a counterbalancing means 45. According to the some embodiments of the present invention counterbalancing means 45 includes a connecting link 46 and a weight 48. The cam arm 40 is attached to the connecting link 46 at one end. The weight 48 is attached to the other end of the connecting link 46. Connecting link 46 may also be connected to a release lever 50. In some embodiments of the present invention the release lever 50 may be counter balanced by a spring 52 or other biasing means well known in the art. The counter balancing spring 52 may be attached to the underside of the ramp 16 on one end and to the release lever 50 on the other end. The release lever 50 may be pivotally attached to the support leg 22 pivot point 60. The weight 48 and the spring 52 combination may result in a counter balanced spring or, in other words, the spring 52 may be preloaded by the weight 48. In some embodiments of the invention, the spring 52 may be only partially counterbalanced.

According to some embodiments of the present invention, the preloading or counter balancing of the weight 48 and spring 52 may be configured so that during a free fall condition the release lever 50 becomes nearly weightless. The stored energy in the spring 52 moves the release lever 50 in respect to the ramp 16. This relative motion moves the connecting link 46, which in turn moves the cam arm 40 to retract within the support member 22. The movement of the cam arm 40 causes the cam surface 38 to retreat through the hole 56 in the support member 22 and disengages the cam surface 38 with the engaging members 34 or 36. Once the engaging surface 34 or 36 are disengaged from the cam surface 38 the support member 22 is free to swing to a support position as dictated by its biasing members, as shown if FIG. 5.

The amount of counter balancing in the relationship between the preloading of the spring 52 and the weight 48 may be tailored for individual situation and installations. The desired result of the counter balancing is so that the cam arm 40 disengages from the engaging surface 34 or 36 when the ramp 16 is falling at a rapid rate, i.e., under the influence of gravity in a free fall condition. In the embodiments illustrated in FIGS. 2, 4–5, the desired result is also the retrieval of the cam arm 40 into the support member 22. If the ramp 16 is moving relatively slowly up and down due to the ramp 16 being used to load and unload a vehicle with fork lifts and other material handling equipment and other normal up and down movements associated with working with dock levelers 10, then preferably the spring 52 will not trigger the cam arm 40 to disengage from the engaging surface 34 or 36.

The relatively low speeds of up and down movement of the ramp 16 are less desirable for triggering the spring 52 to move the cam arm 40 into the support member 22 because the support leg 22 may be deployed when it is not needed and possibly cause a stump out condition. Thus, a predetermined speed or velocity of the ramp 16 moving in a down position may be determined and the preloading and counter balancing in the spring 52 and the weight 48 may be calibrated to accomplish the disengagement of the cam surface 38 and the engaging members 34 or 36 when the ramp 16 achieves a certain predetermined downward velocity and not trigger the spring 52 to move the cam arm 40 to disengage the engaging members 34 and 36 at low ramp descent speeds.

Another embodiment of the invention is shown in FIG. 3. In FIG. 3, the counter balancing spring 52 is removed. A helper spring 35 is added to assist in basing the support member 22 to a support position. The helper spring 35 may be attached to the support member 22 at one end and to a frame portion of the dock leveler at the other end (not shown). In the embodiment shown in FIG. 3, rather than using a spring 52 to cause the release lever 50 to bring the cam arm 40 into the support member 22, inertia forces associated with the weight 48 are used to cause the cam arm 40 to retreat within the support member 22 and disengage the engaging member 36 with the cam surface 38 when the ramp 16 falls at a predetermined rate (e.g., greater than free fall). In some embodiments of the invention as shown in FIG. 3, the weight 48 may be calibrated to avoid low ramp speed deployment of the support legs 22.

Yet another embodiment of the present invention is shown in FIG. 4. In the embodiment shown in FIG. 4 the preloaded counter balancing spring 52 is configured as described in FIG. 2 and the helper spring 35 is also included as described according to FIG. 3.

According to some embodiments of the present invention, the support leg 22 may be blocked from achieving the support position. The cam surface 38, the cam arm 40, and engaging surface 34 or 36 may serve to block the support leg 22 from achieving the support position. The support leg 22 may be unblocked from achieving the support position by movement of the counterbalancing means 45 as herein previously described.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler comprising:
    a ramp configured for movement between a raised and lowered position;
    a support leg coupled to the ramp, the support leg configured to move between a support position and a retracted position, the support leg configured to move to the support position when the ramp moves faster than a predetermined speed toward the lowered position;
    a lip pivotally connected to the ramp and movable between a raised and lowered position;
    an engaging member connected to the lip;
    a cam surface located on a cam arm pivotally attached to the support leg and configured to engage the engaging member to cause the support leg to move to the retracted position when the lip is moved to the raised position and retract toward the support leg and disengage from the engaging member when the ramp moves faster than a predetermined speed toward the lowered position;
    a biasing member having a first and a second end, and being connected to the ramp at the first end; and
    a release lever coupled to the second end of the biasing member, and the release lever also coupled to the support leg.

2. The dock leveler of claim 1, wherein the support leg is biased toward the support position.

3. The dock leveler of claim 2, further comprising at least one spring attached to the support leg for biasing the support leg to the support position.

4. The dock leveler of claim 1, wherein the engaging member comprises at least one of a striker bar and a roller.

5. The dock leveler of claim 1, further comprising a counterbalancing weight coupled to the release lever.

6. The dock leveler of claim 1, further comprising:
    a first leg support located below the ramp configured to receive the support leg in a first support position; and
    a second leg support located below the ramp configured to receive the support leg in a second support position.

7. A support leg apparatus for supporting a dock leveler ramp, comprising:
    a support leg;
    a biasing means for biasing the support leg toward a support position;
    a cam having a cam surface;
    an engaging surface wherein the cam and engaging surface cooperate to move the support leg to a retracted position when the engaging surface is engaged with the cam surface; and
    means for disengaging the cam surface from the engaging surface, the disengaging means configured to move at least one of the cam surface and the engaging surface toward the support leg when the dock leveler ramp falls faster than a predetermined speed, wherein the disengaging means includes a release lever connected to the cam via a connecting link.

8. The support leg apparatus of claim 7, wherein the biasing means is a torsion spring.

9. The support leg apparatus of claim 7, further comprising a weight attached to the release lever.

10. The support leg apparatus of claim 7, further comprising a spring attached to the release lever, counterbalancing the weight to disengage the cam surface from the engaging surface when the ramp moves downward at a predetermined speed.

11. The support leg apparatus of claim 7, further comprising a support sub-frame having a first and second placement position corresponding to a first and second support position.

* * * * *